May 13, 1958   J. E. CHENETTE   2,834,611
BALL AND SOCKET HITCH LOCKING MEANS
Filed Sept. 20, 1956
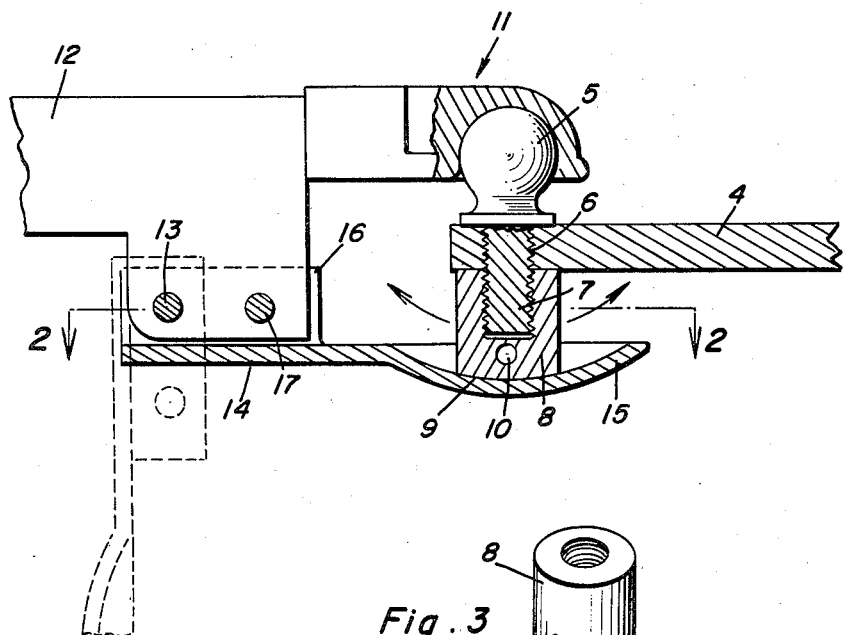
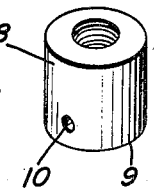
Fig. 3
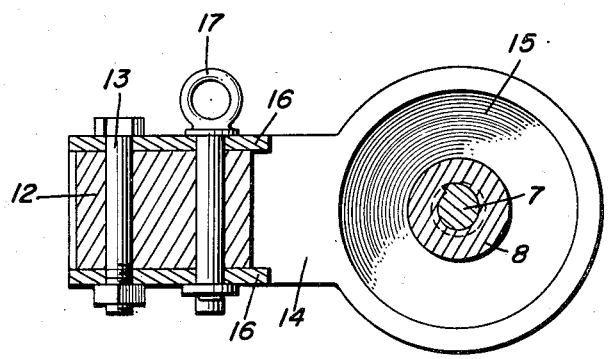
Fig. 2
Joseph E. Chenette
INVENTOR.

United States Patent Office 2,834,611
Patented May 13, 1958

2,834,611

BALL AND SOCKET HITCH LOCKING MEANS

Joseph E. Chenette, Madera, Calif.

Application September 20, 1956, Serial No. 611,060

3 Claims. (Cl. 280—511)

The present invention relates to new and useful improvements in trailer hitches of the ball and socket type and has for its primary object to provide, in a manner as hereinafter set forth, a device of this character comprising novel locking means for positively preventing accidental uncoupling of the trailer from the towing vehicle at all times.

Another very important object of the invention is to provide an improved trailer hitch of the aforementioned character wherein the locking means will interfere in no way with the action of the universal connection.

Other objects of the invention are to provide a trailer hitch of the character described which will be comparatively simple in construction, strong, durable, compact, highly efficient and reliable in use and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view principally in vertical longitudinal section through a trailer hitch embodying the present invention;

Figure 2 is a view in horizontal section taken substantially on the line 2—2 of Figure 1; and Figure 3 is a detail view in perspective of the ball securing nut.

Referring now to the drawing in detail, it will be seen that reference character 4 designates the rear end portion of a drawbar to be mounted on a towing vehicle. Mounted on the rear end portion of the drawbar 4 is an upstanding ball 5. The drawbar 4 is provided with a smooth or threaded opening 6 for the reception of a stud 7 which depends from the ball 5.

Threaded on the stud 7 and engageable beneath the drawbar 4 is a cylindrical securing nut 8 of suitable metal for the ball 5. The nut 8 is of the cap type and comprises a substantially convex or rounded lower end 9. The nut 8 is further provided, in its lower portion, with a diametrically extending hole 10 for the reception of a suitable turning tool.

The ball 5 is engageable in a socket 11 on the forward end of a trailer tongue 12. Pivotally secured, as at 13, for vertical swinging movement beneath the forward end portion of the trailer tongue 12 is a substantially channel-shaped arm or bar 14 of suitable metal. The arm 14 is provided on its free end with an integral, substantially concavo-convex disk or cup 15 which is engageable with the complementally shaped lower end 9 of the nut 8. The upstanding side flanges 16 of the arm 14 straddling the tongue and which are apertured at longitudinally spaced points receive the pivot pin 13, also a removable pin 17 which releasably secures said arm 14 in operative position against swinging movement.

It is thought that the operation or use of the invention will be readily apparent from a consideration of the foregoing. Briefly, the cylindrical, rounded nut 8 secures the ball 5 in position on the drawbar 4. With the arm 14 in the dotted line position of Figure 1 of the drawing in which it gravitates downwardly, the socket 11 is engaged with the ball 5 and secured in the usual manner. The arm 14 is then swung upwardly to engage the cup 15 beneath the nut 8 and the pin 17 is inserted and secured. Thus, the socket 11 is positively secured on the ball 5 and unthreading of the nut 8 is prevented. The substantially concavo-convex disk or cup 15, engaged with the convex lower end 9 of the cylindrical nut 8, intereferes in no way with the universal action of the joint or connection. As hereinbefore stated, a rod or other suitable instrument may be inserted in the opening 10 for tightening or loosening the nut 8. Of course, to disconnect the trailer the foregoing procedure is substantially reversed. The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A trailer hitch of the character described comprising: a drawbar for mounting on a towing vehicle, a tongue for mounting on a trailer, a ball mounted on the drawbar and including a threaded stud depending therefrom through said drawbar, a retaining nut for the ball threaded on the stud and engaged beneath the drawbar, a socket on the tongue for the reception of the ball, and means on the tongue for preventing separation of the socket from the ball and for securing the nut against unthreading on the stud, said means including an arm pivotally mounted on the tongue for upward swinging movement, a disk on the free end of said arm engageable beneath the nut in response to upward swinging of the arm, and means for releasably securing the arm in upward swung position, said arm when released gravitating downwardly into nut releasing position.

2. A trailer hitch of the character described comprising: a drawbar for mounting on a towing vehicle, a tongue for mounting on a trailer, a ball mounted on the drawbar and including a threaded stud depending therefrom through said drawbar, a retaining nut for the ball threaded on the stud and engaged beneath the drawbar, a socket on the tongue for the reception of the ball, and means on the tongue for preventing separation of the socket from the ball and for securing the nut against unthreading on the stud, said means including an arm pivotally mounted on the tongue for upward swinging movement, a disk on the free end of said arm engageable beneath the nut in response to upward swinging of the arm, and means for releasably securing the arm in upwardly swung position, said disk being substantially concavo-convex, said nut including a substantially convex lower end engageable and operable in said disk, said arm when released gravitating downwardly into nut releasing position.

3. A trailer hitch of the character described comprising: a drawbar for mounting on a towing vehicle, said drawbar having an opening therein, an upstanding ball mounted on the drawbar, a stud depending from said ball through the opening in the drawbar, a cylindrical cap nut threaded on the stud and engaged beneath the drawbar for securing the ball in position thereon, said cap nut including a substantially convex lower end, a tongue for mounting on a trailer, a socket on the forward end of said tongue for the reception of the ball, a substantially channel-shaped arm having one end portion pivotally secured beneath the forward end portion of the tongue for swinging movement in a vertical plane, a substantially concavo-convex disk on the free end of the arm engageable with said lower end of said nut for preventing separation of the ball and socket and for securing said nut against unthreading on the stud, and a removable pin insertible in the tongue and arm for securing said arm against swinging movement with the cup in engagement with the nut.

References Cited in the file of this patent

UNITED STATES PATENTS

| | | |
|---|---|---|
| 2,189,710 | Draeger | Feb. 6, 1940 |
| 2,267,969 | Bennett | Dec. 30, 1941 |
| 2,660,460 | Stoddard | Nov. 24, 1953 |
| 2,697,618 | Hulstedt | Dec. 21, 1954 |